(12) United States Patent
Kim

(10) Patent No.: US 6,618,240 B1
(45) Date of Patent: Sep. 9, 2003

(54) COMPUTER HAVING A FLAT PANEL DISPLAY

(75) Inventor: Yeon Song Kim, Kyonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/437,213

(22) Filed: Nov. 10, 1999

(30) Foreign Application Priority Data

Nov. 10, 1998 (KR) ............................................. 98-48070

(51) Int. Cl.⁷ .................................................. G06F 1/16
(52) U.S. Cl. ........................................ 361/681; 361/683
(58) Field of Search ........................ 361/679, 681–683, 361/686; 345/905; 248/917; 359/83

(56) References Cited

U.S. PATENT DOCUMENTS

| 5,422,751 A | * | 6/1995 | Lewis et al. | 359/83 |
| 5,566,048 A | | 10/1996 | Esterberg et al. | 361/681 |
| 5,570,267 A | | 10/1996 | Ma | |
| 5,835,139 A | * | 11/1998 | Yun et al. | 349/58 |
| 5,946,061 A | * | 8/1999 | Kurihara et al. | 349/58 |
| 6,002,582 A | * | 12/1999 | Yeager et al. | 361/681 |
| 6,016,176 A | * | 1/2000 | Kim et al. | 349/84 |
| 6,040,811 A | * | 3/2000 | Malhi | 345/87 |
| 6,101,676 A | * | 8/2000 | Wahl et al. | 16/342 |

FOREIGN PATENT DOCUMENTS

| GB | 2325557 A | 3/1998 |
| GB | 2319110 A | 5/1998 |
| WO | 94/23476 A1 | 10/1994 |
| WO | WO 95/09389 | 4/1995 |
| WO | 95/23367 | 8/1995 |

* cited by examiner

Primary Examiner—Darren Schuberg
Assistant Examiner—Yean-Hsi Chang
(74) Attorney, Agent, or Firm—McKenna Long & Aldridge LLP

(57) ABSTRACT

A portable computer having a body and display assembly pivotally movable with respect to the body via a hinge mechanism, the display assembly including a hinge frame coupled to the hinge mechanism, the hinge frame including a side vertical wall, a lower wall and an upper wall, and the lower wall and the upper wall being substantially perpendicular to the side vertical wall and spaced from each other; and a display module clamped with the lower wall and the upper wall.

23 Claims, 8 Drawing Sheets

COMPUTER HAVING A FLAT PANEL DISPLAY

This application claims the benefit of Korean Patent Application No. 1998-48070, filed on Nov. 10, 1998, which is hereby incorporated by reference.

BACKGROUND OF THE INVENTION

1. Field of the Invention

The present invention relates to a flat panel display device, and more particularly, to a flat plane display device mounting structure on a computer.

2. Discussion of the Related Art

Flat panel display devices include liquid crystal display devices (LCD) which are used widely, plasma display panels (PDP), and field emission displays (FED) which have been studied recently and may be applied to computers in the near future.

For convenience of explanation, the present invention will be discussed with respect to the LCD as an example of a flat screen type display device and a portable computer mounted with the LCD.

Referring to FIG. 1, a general portable computer such as a laptop or notebook computer typically includes a body 100, a flat panel display device assembly 110 coupled to the body 100 via a hinge mechanism 124. The flat panel, display device assembly 110 has a flat panel display module 111 and a display case 122 supporting the module 111. The body 100 has an input device 102 such as a keyboard. As a flat panel display module 111, the LCD is widely used in portable computers and flat screen monitors.

Referring to FIG. 2 which shows a conventional assembly structure of the LCD device applied to a conventional portable computer, the display case 122 has a rear case 123 and a front case or frame 121 for mounting the LCD module 130. The rear case 123 has an outer surface and an inner surface and connecting ribs 123a formed at the corners.

The LCD module 130 has an LCD panel 132, a back light device 134 fixed to the back of the LCD panel 132, and a metal sash or supporting frame 136 for assembling the panel 132 and the back light device 134 along the edge.

At the corners of the metal sash 136, corresponding to the positions of the ribs 123a of the rear case 123, a plurality of protrusions 136a having holes are formed.

For mounting the LCD module 130 to the case 122, the LCD module 130 is placed on the rear case 123 and the holes of the metal sash 136 and the ribs 123a are fastened together preferably by screws 138. The front case 121 is coupled to the rear case 123.

Hereinafter, the way in which the LCD module is mounted to the case from the front toward the rear direction is defined as the front mounting method, and the assembled structure of the LCD module and the case made through the front mounting method is defined as the front mounting structure.

In the front mounting structure of the LCD device, since the protrusions 136a require additional space corresponding to the protruded width "d", the ratio of the display area of the LCD module to the fixed size of the case 122 is reduced.

The front mounting structure may also include an additional feature to further support the LCD panel, as shown in FIGS. 3A and 3B.

Referring to FIGS. 3A and 3B, a conventional LCD device assembly 110 includes an LCD panel 112, a back light device (not shown) for the LCD panel, and a display case 122 supporting the LCD module 111. The LCD panel 112 and the back light device are assembled by a metal sash 114 along the edges together with a plastic mold frame (not shown) supporting the back light device.

The display case 122 is coupled to a body 120 via a hinge mechanism 124, which may extend from the body 120. The display case 122 and the hinge mechanism 124 allow the display device assembly 110 to pivotally move with respect to the body 120.

Two opposite sides of the metal sash 114 include flanges 114a for assembling the LCD module 111 to the display case 122, and flanges 114b for assembling the LCD module 111 to the hinge frame or hinge arm 126. Hereinafter, the former is referred as a fixing flange and the latter is referred as a mounting flange in this specification for distinction purposes. As shown in FIG. 3B, the fixing flanges 114a have a protruding width d2 and the mounting flanges 114b have a protruding width d1. A screw hole is formed in each of the flanges 114a and 114b. On the inner surface of the display case 122, ribs 122a are formed corresponding to the holes of the fixing flange 114a.

To mount the LCD module 111, the hinge frame 126 and the mounting flanges 114b of the metal sash 114 are screwed together, and the fixing flanges 114a of the metal sash 114 and the ribs 122a are screwed together by bolts 128.

In the mounting structure shown in FIG. 3B, the metal sash or support frame 114 requires side spaces for the flanges 114a and 114b. Therefore, the side space D (d1+d2) results in a reduction of the ratio of the display area of the LCD panel 112 relative to the display case 122. Moreover, as the display size increases, the display case becomes undesirably large, especially for a portable computer such as a laptop computer.

To solve the above problem, an assembling structure has been suggested, as shown in FIG. 4, which is a partial perspective view. The hinge arm or frame 126, the case 122 and the side wall portion of the display module 110 are screwed together by bolts 128. However, although the embodiment shown in FIG. 4 is a good solution, there may be some instances where it is desired to attach the hinge arm, the case and the side wall portion of the display module without using a screw hole in the side wall portion of the display module.

SUMMARY OF THE INVENTION

Accordingly, the present invention is directed to a portable computer that substantially obviates one or more of the problems due to limitations and disadvantages of the related art.

An object of the present invention is to minimize the non-display area of the LCD device.

Another object of the present invention is to provide a computer having a flat panel display device with a maximum display area and a minimal display case size.

A further object of the present invention is to provide a mounting structure for flat panel display device on a computer.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides, in one aspect, a computer comprising a system body; a flat panel display device having a side wall portion, a display surface and a rear surface; and a hinge mechanism coupling the system body and the display device, having a fastening element for putting the flat panel display device therein.

In another aspect, the present provides a computer comprising a system body; a flat panel display device including a side wall portion having at least one fixing hole; and a hinge mechanism coupling the system body and the display device, including at least one protrusion corresponding to the fixing hole of the side wall portion of the display device.

The hinge mechanism has a pin portion and a hinge mount. The fastening element has a shape of letter "C". The hinge frame has first and second supporting portions for supporting the display and rear surfaces of the display device, respectively. The hinge frame has third and fourth supporting portions spaced from each other by a side length "1" of the display module to support the side wall portion of the display device. The first and second supporting portions are upper and lower walls spaced from each other by a height of the side wall portion of the display device. The third and fourth supporting portions are end walls spaced from each other by a side length of the display device. The hinge frame has a shape of letter "L". The hinge frame has side vertical and lower walls and a top protrusion which is positioned at a top of the side vertical wall, a height of which is substantially same as that of the side wall portion of the display device. The hinge frame further includes fifth and sixth supporting portions spaced from each other by a side length of the display device. The top protrusion is positioned near the fifth supporting portion. A case covers and supports the display surface of the display device. The hinge frame has a shape of elongated plate member, including lower and upper supporting portions. The hinge frame further includes a fixing element for restricting movement of the display device in an elongated (longitudinal) direction of the hinge frame. The fixing element has two supporting protrusions spaced from each other by a side length of the display device. The upper supporting portion has a thickness thinner than that of the hinge frame body. The upper supporting portion is bendable. The flat panel display device has a metal sash for supporting side thereof, and the metal sash has the side wall portion. The side wall portion of the metal sash has a hole member having the fixing hole. The hole member is made of plastic material. The hole has a rectangular shape. An inlet portion of the hole is narrower than inner side thereof. The protrusion is a fastener.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 5:
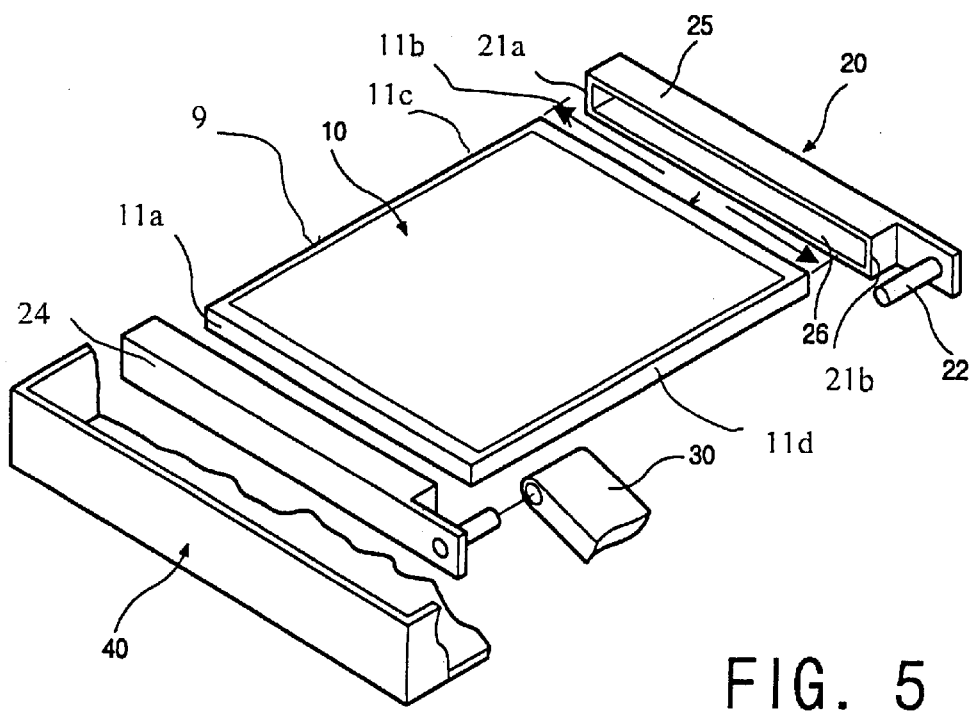
FIG. 5 shows a mounting structure according to a first embodiment of the present invention.

Referring FIG. 5, which shows a first embodiment of the present invention, a display module 10, a bracket or hinge frame 20, a hinge mount 30 and a case 40 are shown. The substantially rectangular shaped display module 10 does not need a screw hole at a side wall or peripheral portion 11. The side wall portion has a left side surface 11a, a right side surface 11b, an upper side surface 11c and a lower side surface 11d. The module is inserted in the hinge frame 20. The hinge frame 20 has a side vertical wall 24, a lower wall 26 and an upper wall 25 for fixing the side wall portion 11 of the display module 10. That is, a cross section of the hinge frame 20 preferably has a "C" shape. The display module 10 is inserted between the lower wall 26 and the upper wall 25.

To tightly fix the display module 10 in the hinge frame 20, the hinge frame 20 preferably has an upper vertical wall 21a and a lower vertical wall 21b connecting the upper and lower walls 25 and 26. The upper and lower vertical walls 21a and 21b fix the display module 10 so that the display module 10 does not move in the longitudinal direction of the hinge frame 20.

The hinge frame 20 is coupled to the hinge mount 30 through a pin portion 22. The pin portion 22 may be integrally formed with the hinge frame 20. The hinge frame 20 can be coupled to the hinge mount 30 through any suitable connecting means such as a screw.

Figure 6:
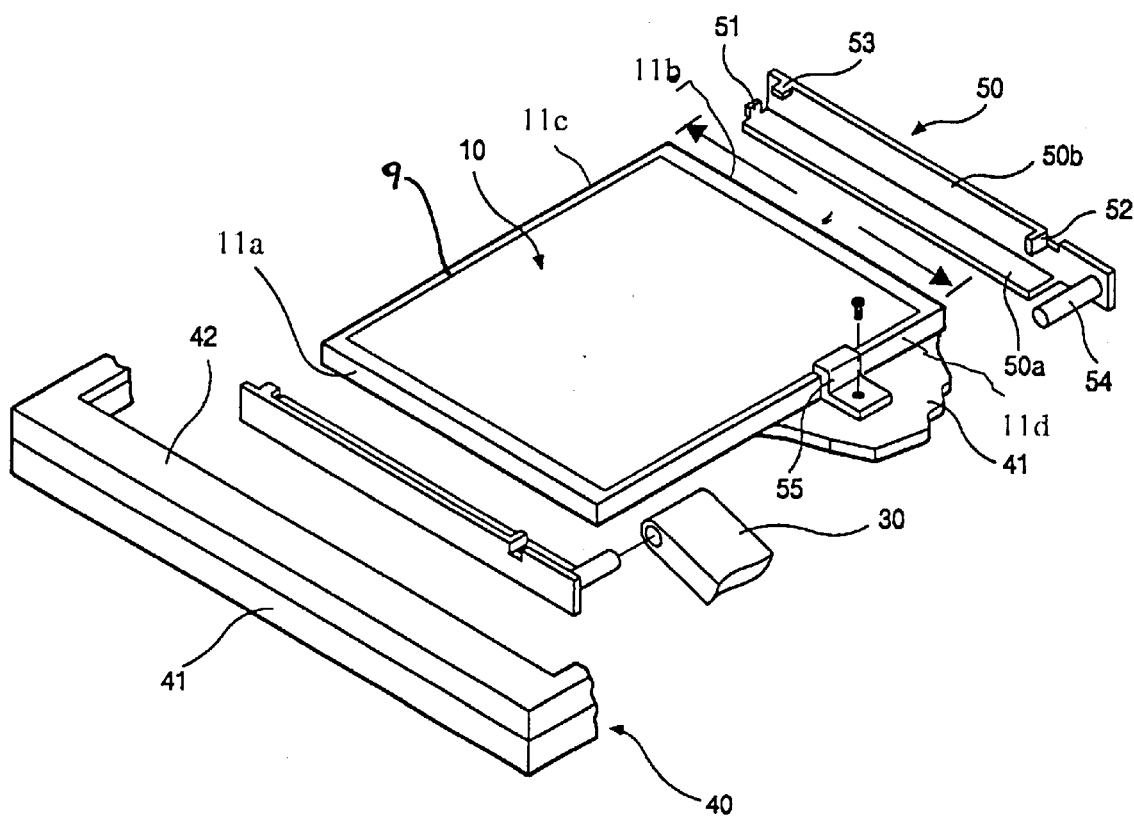
FIG. 6 shows a mounting structure according to a second embodiment of the present invention.

FIG. 6 shows a second embodiment of the present invention. According to the first embodiment, even if the display module can be mounted to the display cover without using a screw, it may be difficult to put the display module 10 in the hinge frame 20 after the hinge frame 20 is coupled to the hinge mount 30. The second embodiment makes it easier to place the display module 10 in the hinge frame 20.

Referring to FIG. 6, the LCD device assembly includes an LCD panel and a back light device (not shown) for the LCD panel, and display case 40 supporting the display device (LCD) module 10. The LCD panel and the back light device are assembled by a metal sash 9 along the edges together with a plastic mold frame (not shown) supporting the back light device.

The display module 10 has a front surface, a rear surface and a side wall portion 11. The side wall portion 11 has a left side surface 11a, a right side surface 11b, an upper side surface 11c and a lower side surface 11d. The metal sash 9 covers the periphery of the LCD panel. The rear surface of the display module 10 is parallel to the front surface and has a printed circuit board (PCB)(not shown) attached thereto. The side wall portion 11 is perpendicular to the front and rear surfaces.

Figure 1:
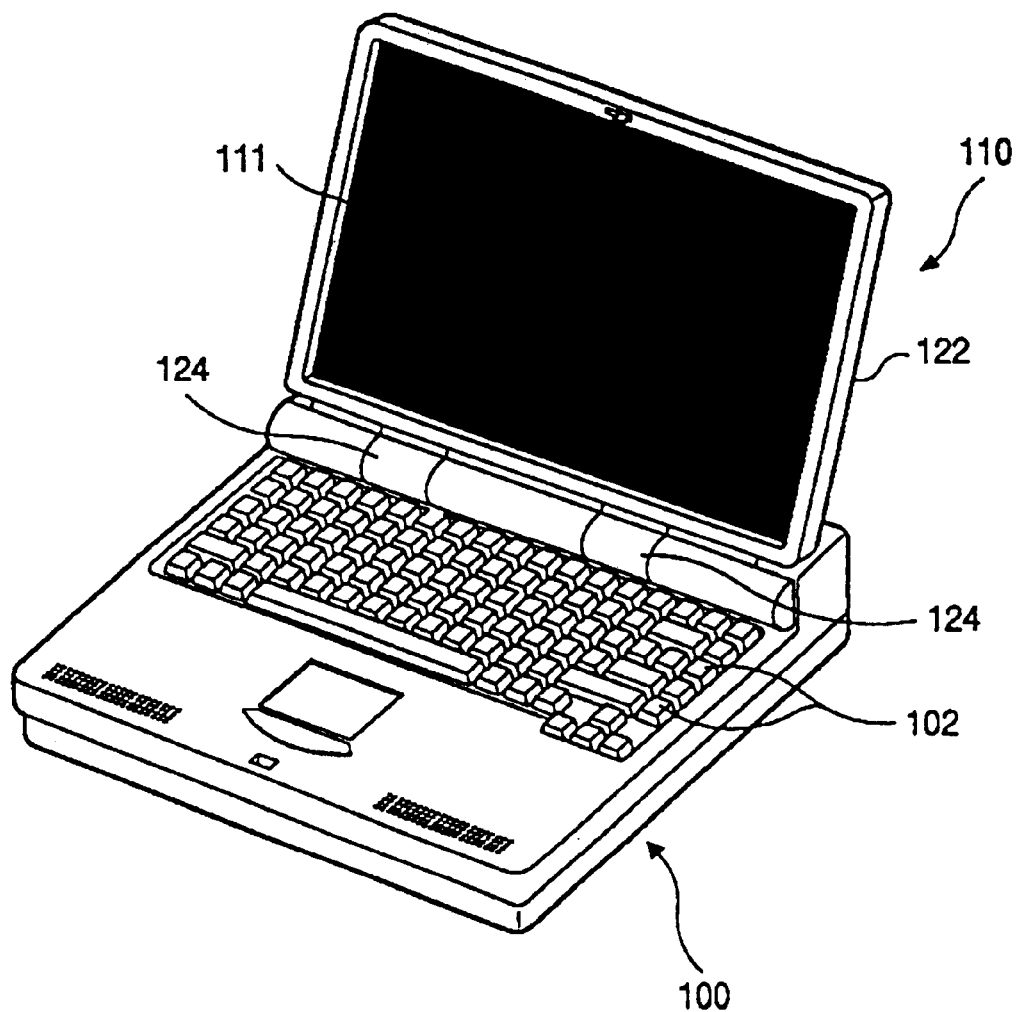
FIG. 1 is a perspective view showing a general portable computer.
Figure 2:
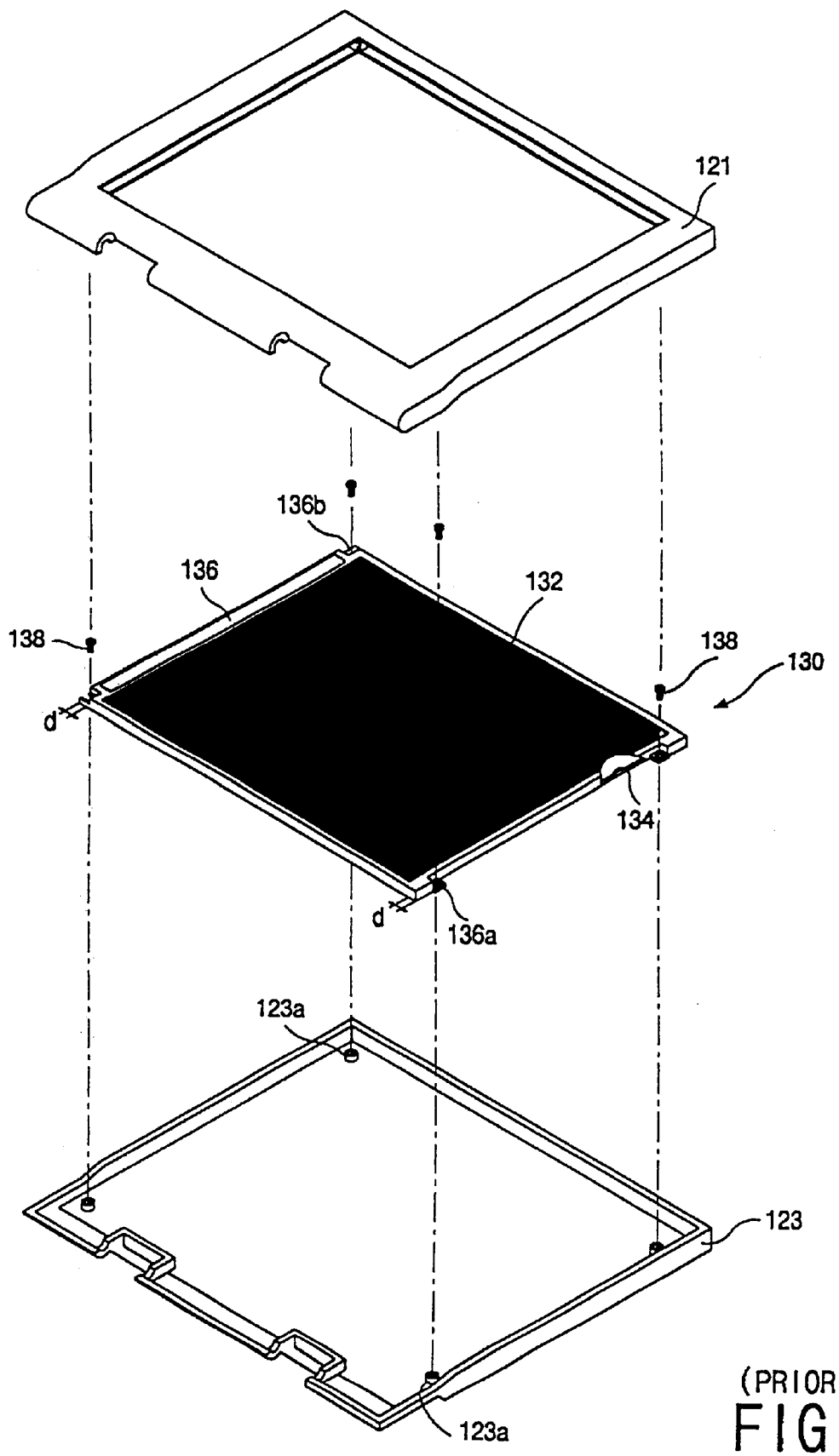
FIG. 2 shows a conventional mounting structure of the LCD device for a portable computer.
Figure 3A:
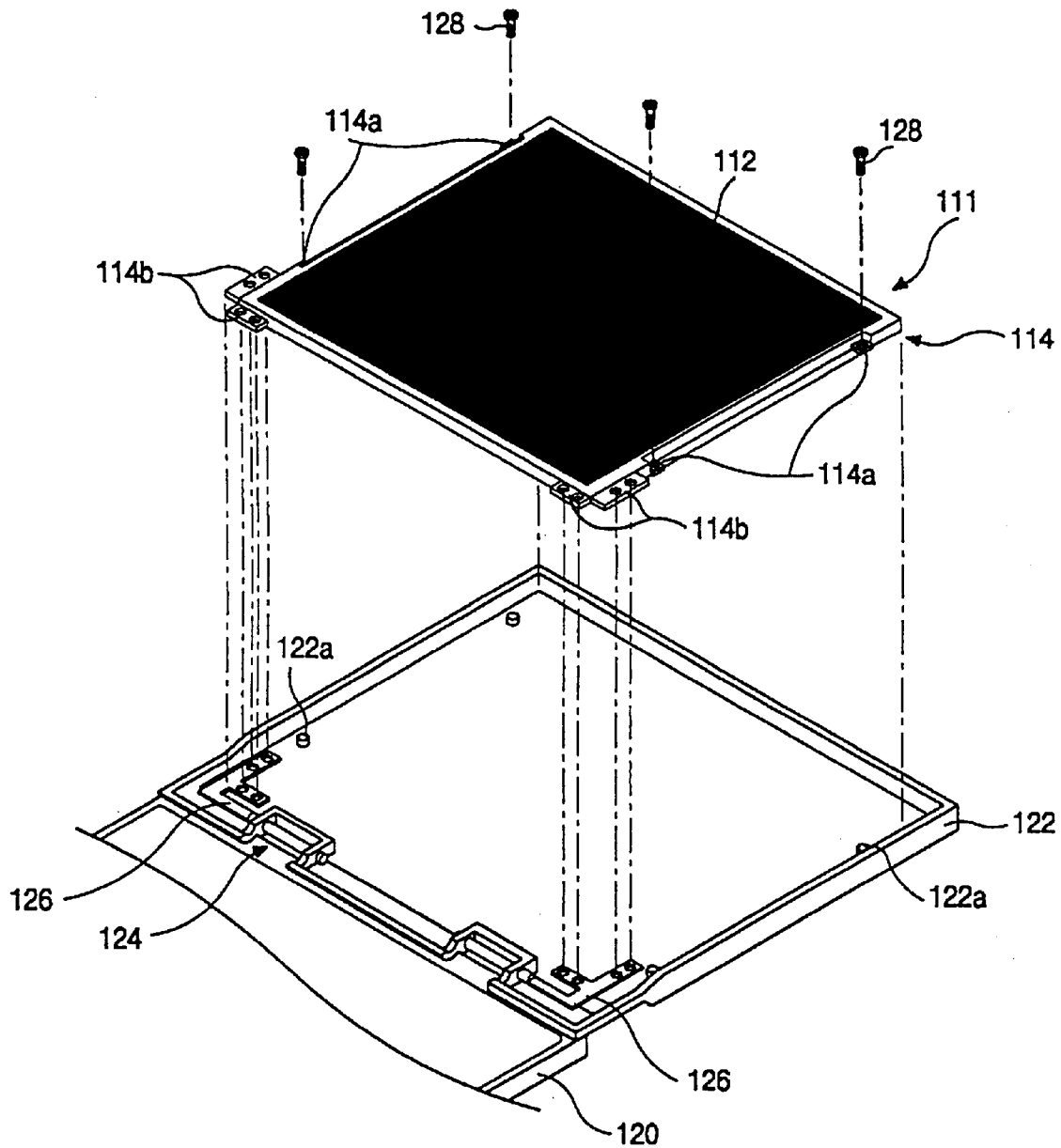
FIGS. 3A and 3B are a perspective view and a front view, respectively, showing a mounting structure of the LCD device for a portable computer.
Figure 3B:
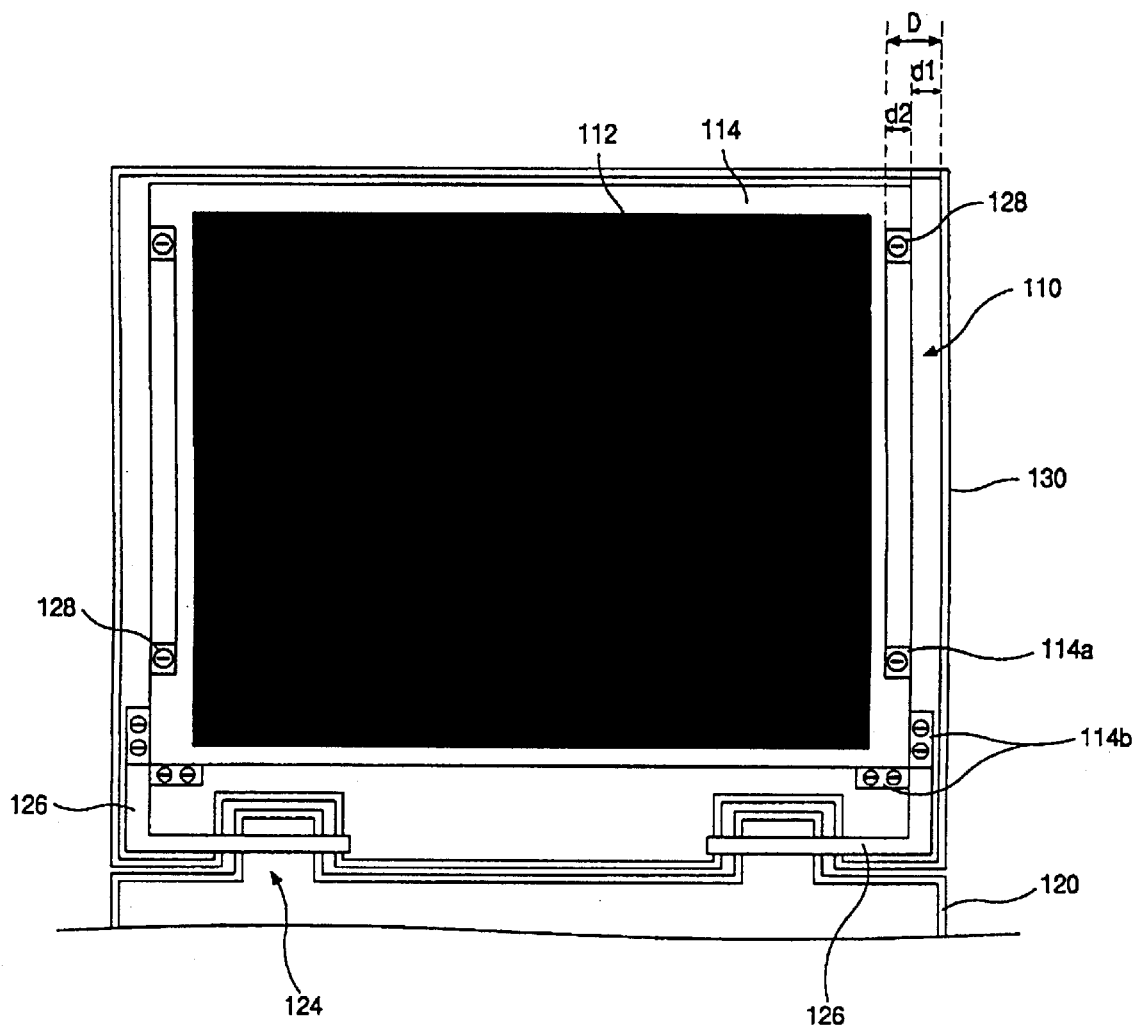
Figure 4:
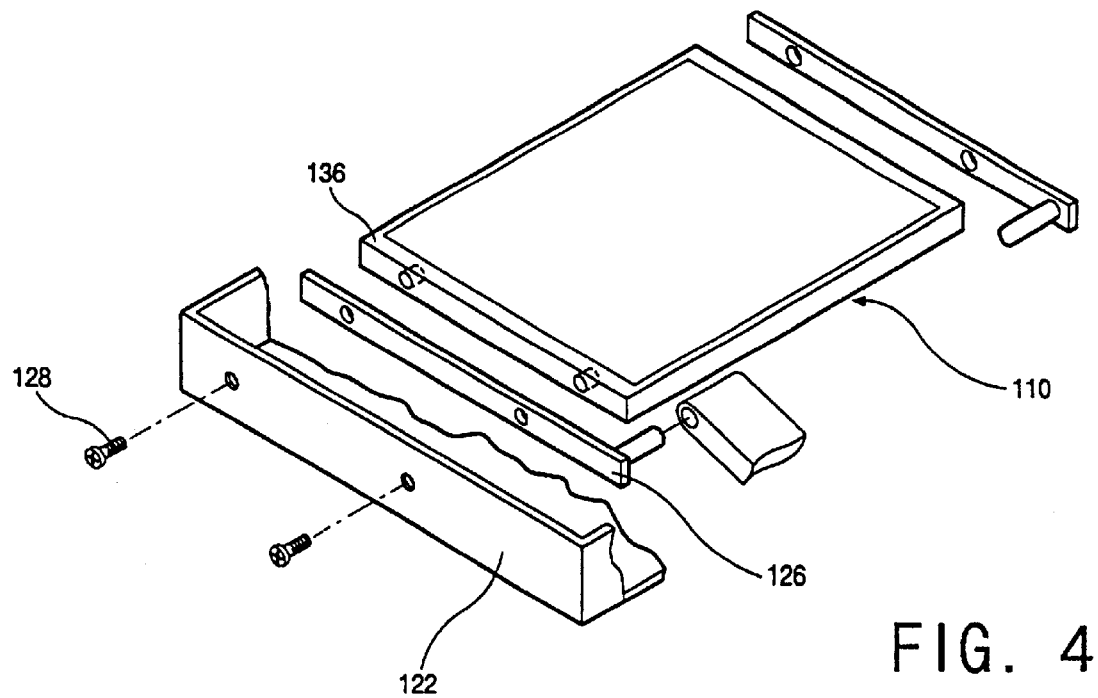
FIG. 4 is a partial view showing another mounting structure of the LCD device for a portable computer.

The display case 40 has a rear case 41 and a front case or frame 42 for mounting the LCD module 10. The hinge mount 30 and a pin portion 54 constitute a hinge mechanism. The hinge mount 30 is fixed to or extended from the body (see FIG. 1, for example) and the pin portion 54 is fixed to the hinge frame 50. Alternatively, the hinge mount 30 can be fixed to the hinge frame 50 and the pin portion 54 to the body. The display module 10 and the hinge mount 30 are assembled through a hinge frame 50, allowing the display device assembly to pivotally move with respect to the body.

The hinge frame 50 has an "L" shape. That is, the hinge frame 50 has a lower wall 50a and a side vertical wall 50b. Compared to the first embodiment where the upper wall is continuously formed along the upper edge of the side vertical wall, the second embodiment has an upper fixing tab 53 that is partially formed along the upper edge of the side vertical wall 50b, for suppressing the metal sash 9 of the front surface of the display module 10. When the display module 10 is assembled with the hinge frame 50, the lower wall 50a and the side vertical wall 50b support a rear surface and a side wall portion 11 of the display module 10, respectively. Once assembled, the lower wall 50a and the side vertical wall 50b are parallel to the rear surface and the right and left side surfaces 11a and 11b, respectively.

The hinge frame 50 also has first and second bent portions 51 and 52, as upper and lower vertical walls, and upper fixing tab 53. The first bent portion 51 is formed at an end of the lower wall 50a. The second bent portion 52 is formed near the pin portion 54 at a top portion of the side vertical wall 50b, preferably spaced from the first bent portion 51 by the side length "l" of the display module 10.

The first bent portion 51 is bent upwardly from the lower wall 50a and the second bent portion 52 is bent inward from the side vertical wall 50b toward the side wall portion 11. The first and second bent portions 51 and 52 fix the display module 10, by pressing the upper side surface 11c and the lower side surface 11d, respectively, so that the display module 10 does not move in the longitudinal direction of the hinge frame 50.

The upper fixing tab 53 is formed near the first bent portion 51 by being bent from the side vertical direction to the side direction. Therefore, the direction of the upper fixing tab 53 is perpendicular to the direction of the side vertical wall 50b and parallel to the direction of the lower wall 50a. Thus, it is possible to mount the display module 10 even after the hinge frame 50 is coupled to the hinge mount 30. That is, the display module 10 is first placed between the first bent portions 51 and upper fixing tab 53. The upper fixing tab 53 prevents the display module 10 from moving vertically by pressing the metal sash 9. The display module 10 is clamped by the lower wall 50a and upper fixing tab 53.

The case 40 has front and rear cases 42 and 41, that also restrict the vertical movement of the display module 10. There may be screw holes on the side vertical and/or lower walls for fixing the hinge frame 50 to the rear case 41 with screws.

Furthermore, a bracket 55 can be adopted for fixing the display module 10 to the case 40.

Figure 7:
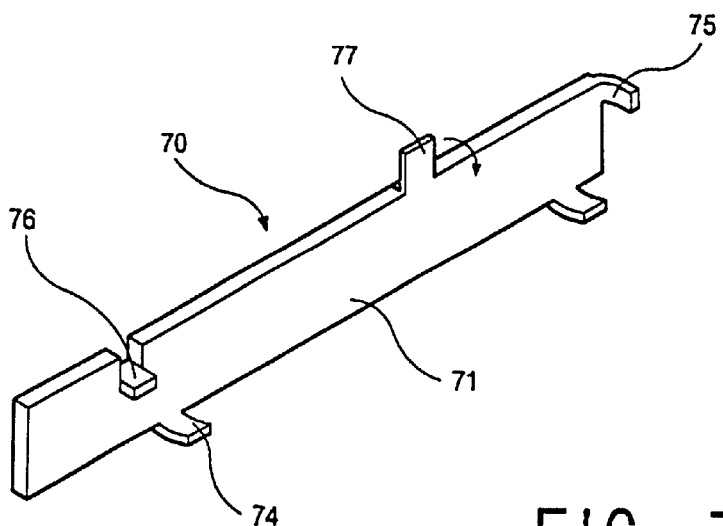
FIG. 7 is a perspective view showing a hinge frame according to a third embodiment of the invention.

FIG. 7 shows a hinge frame 70 according to a third embodiment of the invention. In the first and second embodiments, because the lower walls 26 and 50a for supporting the rear surface are continuously formed along the lower edge of the side vertical wall of the hinge frame, the display assembly may be heavier than needed. Accordingly in the third embodiment, the hinge frame component for supporting the rear surface of the display module 10 is formed having a discrete shape.

The hinge frame 70 of the third embodiment is similar to the hinge frame 50 shown in FIG. 6, but the hinge frame 70 does not have an "L" shape. Instead of a rear surface, as in the second embodiment, the hinge frame 70 has at least one bent portion 74 extending inwardly from the lower edge of the side vertical wall 71 to support the rear surface of the display module 10 (see FIG. 6). Other bent portions such as bent portions 75 and 76, as an upper vertical wall and a lower vertical wall, are preferably spaced from each other by the side length "l" of the display module, similar to the first and second bent portions of FIG. 6, in order to restrict the longitudinal movement of the display module.

The hinge frame 70 also has an upper fixing tab 77 for restricting the vertical movement of the display device similar to the upper fixing tab 53 of FIG. 6. The display module 10 is clamped by the bent portion 74 and upper fixing tab 77. The position of the upper fixing tab 77 is not limited, since the upper fixing tab 77 is bent over the display module after the display device is placed between the bent portions 75 and 76. The upper fixing tab 77 is preferably made thinner than that of the main part of the hinge frame 71 for easier bending.

Figure 8:
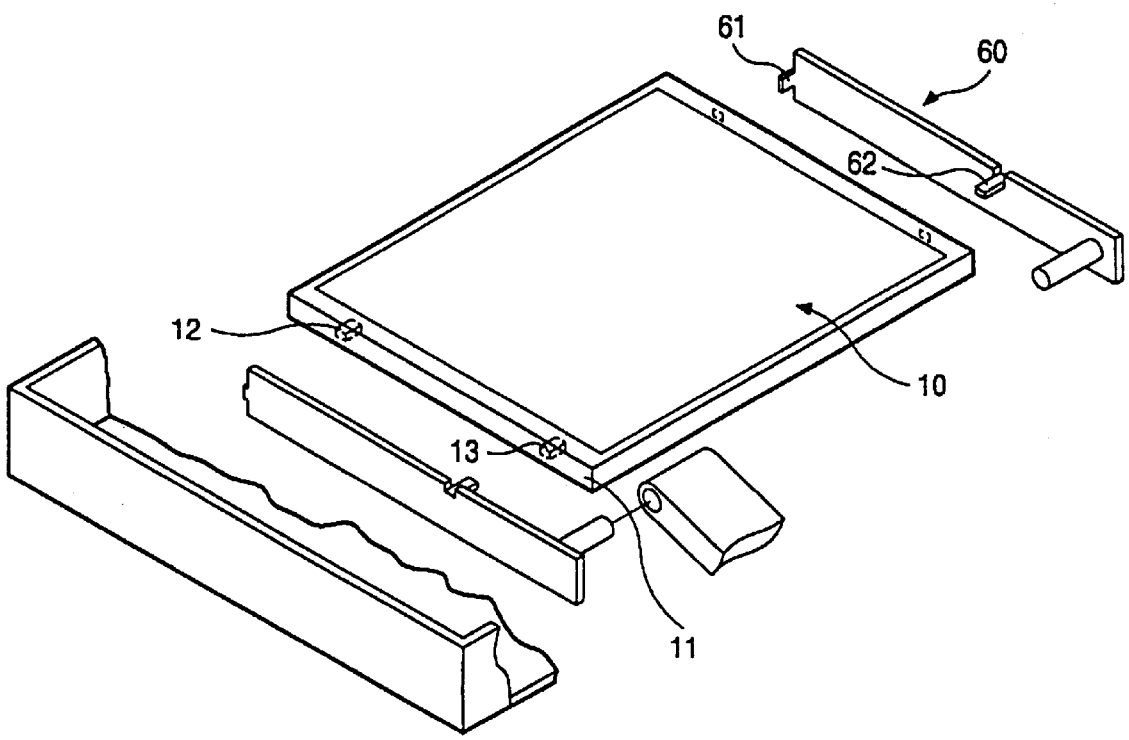
FIG. 8 shows a mounting structure according to a fourth embodiment of the present invention.

FIG. 8 shows a mounting structure according to a fourth embodiment of the present invention. Side wall portion 11 of the display module 10 has a plurality of holes 12 and 13, and the hinge frame 60 has a plurality of protrusions 61 and 62 corresponding to the holes 12 and 13, respectively, to mount the hinge frame 60 to the display module 10.

Figure 9:
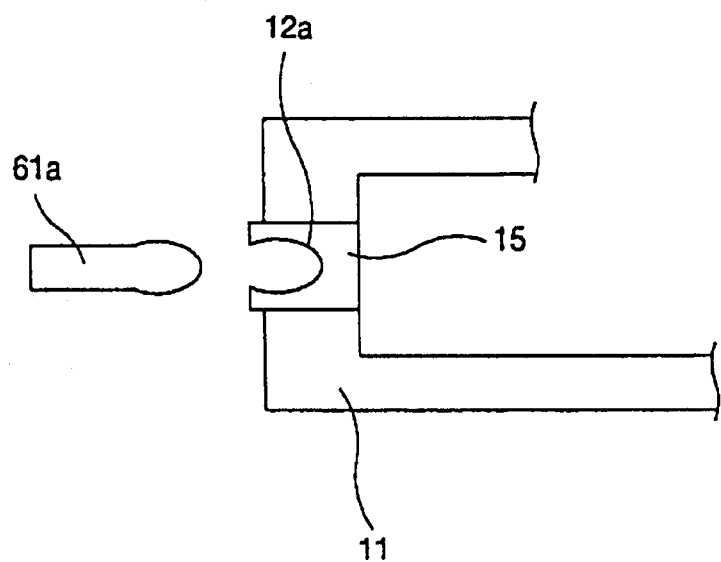
FIG. 9 is a sectional view showing a modified hole and a protrusion according to the fourth embodiment of the invention.

The sectional shape of the holes 12 and 13 and the protrusions 61 and 62 can be rectangular as shown in FIG. 8. FIG. 9 shows a modified example. The hole 12 can be formed integrally with the side wall portion 11 or metal sash of the display module 10 as shown in FIG. 8. A hole housing 15 having a hole 12a can be inserted to the side wall portion 11. The hole housing 15 is preferably made of a flexible material such as plastic or rubber. The entrance of the hole 12a is preferably smaller than that of the inner space of the hole 12a for a tight fit. The corresponding protrusion 61a is preferably a plastic hook or fastener.

Figure 10:
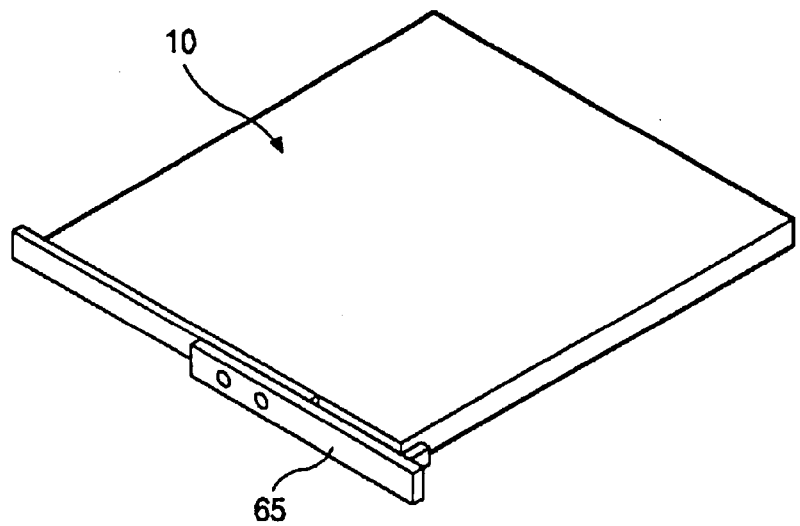
FIG. 10 is a perspective view showing a modified hinge frame according to the fourth embodiment of the invention.

FIG. 10 shows another example of the hinge frame which has an additional frame member 65 coupled to any of the hinge frames 20, 50, 70 and 60 of FIGS. 5, 6, 7 and 8, respectively.

It will be apparent to those skilled in the art that various modifications and variation can be made in the computer having a flat panel display of the present invention without departing from the spirit or scope of the invention. Thus, it is intended that the present invention cover the modifications and variations of this invention provided they come within the scope of the appended claims and their equivalents.

What is claimed is:

1. A portable computer having a body and display assembly pivotally movable with respect to the body via a hinge mechanism, the display assembly comprising:

two hinge frames coupled to the hinge mechanism, each hinge frame includes a side vertical wall, a lower wall and an upper wall, and the lower wall and the upper wall being substantially perpendicular to the side vertical wall and spaced from each other; and a display module clamped with the lower wall and the upper wall of each hinge frame.

2. A portable computer according to claim 1, wherein the upper wall of one of the hinge frames is partially formed along an upper edge of the side vertical wall of the one of the hinge frames.

3. A portable computer according to claim 2, wherein the upper wall of one of the hinge frames is bent from the upper edge of the side vertical wall of the one of the hinge frames.

4. A portable computer according to claim 1, wherein the display module includes a front surface having a metal sash at the periphery thereof, wherein the upper wall of one of the hinge frames presses the metal sash.

5. A portable computer according to claim 4, wherein the upper wall of one of the hinge frames is partially formed along an upper edge of the side vertical wall of the of one of the hinge frames.

6. A portable computer according to claim 1, wherein the display module includes a display surface and a lower and an upper side surfaces, and of one of the hinge frames further includes an upper and lower vertical walls supporting the upper and lower side surfaces respectively so that the display module does not move in a longitudinal direction of the one of the hinge frames.

7. A portable computer having a body and display assembly pivotally movable with respect to the body via a hinge mechanism, the display assembly comprising:
   a display module including a display surface, a rear surface parallel to the display surface, and a side wall portion, the side wall portion having a right side surface, a left side surface, an upper side surface and a lower side surface; and
   a unitary hinge frame coupled to the hinge mechanism and supporting the display module, the unitary hinge frame including a side vertical wall supporting one of the right and left side surfaces, a lower wall supporting the rear surface, and upper and lower vertical walls perpendicular to the side vertical wall and the lower wall;
   wherein the upper and lower vertical walls support the upper and lower side surfaces of the display module respectively so that the display module does not move in a longitudinal direction of the unitary hinge frame.

8. A portable computer according to claim 7, the hinge frame further including an upper wall pressing the display surface of the display module.

9. A portable computer according to claim 8, wherein the tipper wall is partially formed along an upper edge of the side vertical wall.

10. A portable computer according to claim 9, wherein the upper wall is bent from the edge of the side vertical wall.

11. A portable computer according to claim 7, wherein the upper vertical wall and the lower vertical wall are spaced from each other by a side length of the display.

12. A computer, comprising,
   a system body;
   a flat panel display module including a major surface and a side wall portion substantially perpendicular to the major surface, the side wall portion having at least one fixing hole; and
   a hinge mechanism coupling the system body and the flat panel display module, including at least one protrusion corresponding to the fixing hole of the side wall portion of the flat panel display module.

13. A computer according to claim 12, wherein the hinge mechanism includes a hinge frame having the protrusion and a hinge mount.

14. A computer according to claim 12, wherein the side wall portion has a hole member having the fixing hole.

15. A computer according to claim 14, wherein the hole member is made of plastic material.

16. A computer, comprising, a system body;
   a flat panel display module including a side wall portion having at least one fixing hole; and
   a hinge mechanism coupling the system body and the flat panel display module, including at least one protrusion corresponding to the fixing hole of the side wall portion, wherein the fixing hole has a rectangular shape.

17. A computer according to claim 16, wherein the hinge mechanism includes a hinge frame having the protrusion and a hinge mount.

18. A computer according to claim 16, wherein the side wall portion has a hole member having the fixing hole.

19. A computer according to claim 18, wherein the hole member is made of plastic material.

20. A portable computer, comprising:
   a body;
   a display assembly;
   a hinge mechanism for pivotally moving the display assembly with respect to the body; the display assembly further comprising:
      a unitary hinge frame coupled to the hinge mechanism, the unitary hinge frame including:
         a side vertical wall;
         a lower wall; and
         an upper wall;
         wherein the lower wall and the upper wall are substantially perpendicular to the side vertical wall and are space apart from each other; and
      a display module clamped between the lower wall and the upper wall.

21. A portable computer according to claim 20, wherein the upper wall is partially formed along an upper edge of the side vertical wall.

22. A portable computer according to claim 21, wherein the upper wall is bent from the upper edge of the side vertical wall.

23. A portable computer according to claim 20, wherein the display module includes a front surface having a metal sash at the periphery thereof, wherein the upper wall presses the metal sash.

* * * * *